Figure 1:
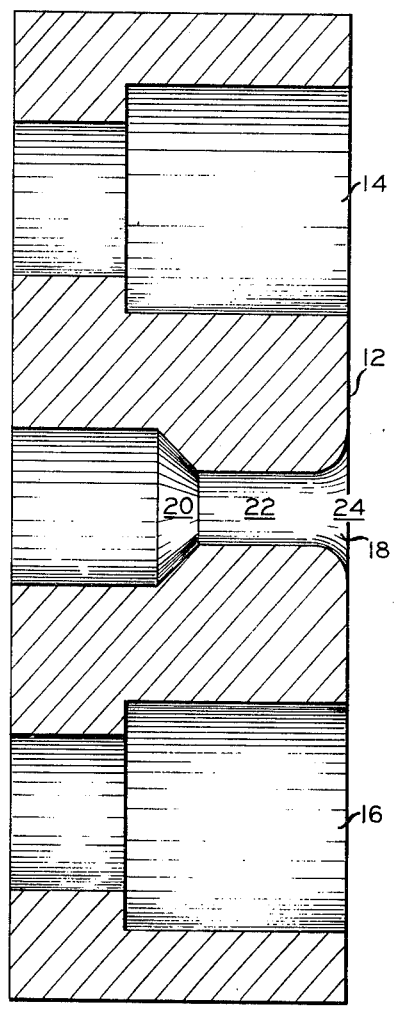

United States Patent [19]

Cooper

[11] 4,056,597
[45] Nov. 1, 1977

[54] PROCESS AND DIE FOR EXTRUSION OF A RESINOUS MATERIAL

[75] Inventor: Earl D. Cooper, Borger, Tex.

[73] Assignee: Phillips Petroleum Company, Bartlesville, Okla.

[21] Appl. No.: 564,685

[22] Filed: Apr. 3, 1975

[51] Int. Cl.² .......................... D01D 1/10; B28B 21/54
[52] U.S. Cl. ................................ 264/169; 264/177 F; 425/461; 425/464
[58] Field of Search .......................... 264/177 F, 169; 425/461, 464

[56] References Cited

U.S. PATENT DOCUMENTS

| 2,164,750 | 7/1939 | Nadler | 425/461 |
| 2,245,608 | 6/1941 | Rogers | 264/177 F |
| 2,491,588 | 12/1949 | Shively | 264/177 F |
| 2,677,148 | 5/1954 | Webb | 425/464 |
| 3,008,434 | 11/1961 | Maldari | 425/461 |
| 3,123,858 | 3/1964 | McDermott | 425/464 |
| 3,461,193 | 8/1969 | Gilardi | 425/461 |
| 3,558,420 | 1/1971 | Opfell | 264/177 F |
| 3,737,506 | 6/1973 | Martin et al. | 264/176 F |

FOREIGN PATENT DOCUMENTS

| 1,299,629 | 12/1962 | France | 264/176 F |
| 591,055 | 4/1959 | Italy | 425/461 |
| 44-901 | 1/1969 | Japan | 425/461 |
| 44-4248 | 2/1969 | Japan | 425/464 |
| 1,219,110 | 1/1971 | United Kingdom | 264/184 |

Primary Examiner—Jay H. Woo

[57] ABSTRACT

A resinous material is extruded through an orifice in a die to produce a strand, the orifice having an inlet zone, a cylindrical zone and an outlet zone, the inlet zone converging in the direction of flow of the resinous material and attached to one end of the cylindrical zone and the outlet zone diverging in the direction of flow of the resinous material and attached to the other end of the cylindrical zone. A die for extrusion of a resinous material is provided.

7 Claims, 2 Drawing Figures

PROCESS AND DIE FOR EXTRUSION OF A RESINOUS MATERIAL

BACKGROUND OF THE INVENTION

The invention relates to a process and die for extrusion of a resinous material.

One of the more common procedures in the production of various resinous materials is the extrusion of such material through an opening orifice under heat and pressure to produce a strand generally around ⅛-inch diameter. The orifice or orifices through which a resinous material is extruded is made in a member of an extrusion apparatus generally referred to as a die, die plate or nosepiece.

In the extrusion of resinous materials one of the problems encountered is the buildup or accumulation of resinous material at the outlet of the orifice. This accumulated material oxidizes and crosslinks, resulting in impurities and nonuniformity in the resinous material which subsequently adversely affects the products produced from the extruded strands.

One method known in the art for reducing the buildup of resinous material around the outlet of the orifice is to use a die with the outer surface consisting essentially of tetrafluoroethylene polymer. Although the above-described method has proven to be useful, there is still a desire for new and improved methods and dies for the extrusion of resinous materials.

An object of the invention is to reduce the buildup of resinous material around the orifice of an extrusion die.

Other objects, aspects and advantages of the invention will be apparent to those skilled in the art after studying the specification and appended drawings.

SUMMARY OF THE INVENTION

In accordance with the invention a resinous material is extruded through an orifice in a die to produce a strand, the orifice having an inlet zone, a cylindrical zone and an outlet zone, the inlet zone converging in the direction of flow of the resinous material and attached to one end of the cylindrical zone and the outlet zone diverging in the direction of flow of the resinous material and attached to the other end of the cylindrical zone. A die for extrusion of a resinous material is provided.

Further in accordance with the invention a die is provided for extruding a strand resinous material comprising a base having at least one orifice through the resinous material is extruded, the orifice having an inlet portion, a cylindrical portion and an outlet portion, the inlet portion converging in the direction of flow of the resinous material and attached to one end of the cylindrical portion, and the outlet portion diverging in the direction of flow of the resinous material and attached to the other end of the cylindrical portion.

Figure 2:
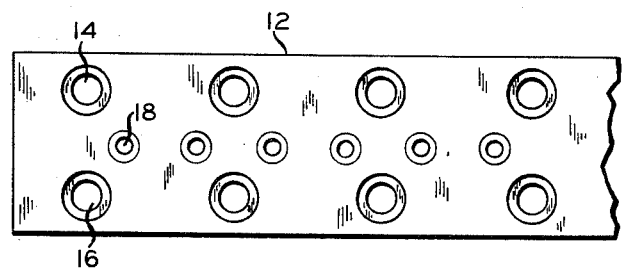

In the drawings:

FIG. 1 is a vertical cross section of an embodiment of a die of the invention, and FIG. 2 is a front elevation of the die of FIG. 1.

Referring to FIG. 1, there is shown a die body 12 having bolt holes 14 and 16 for mounting the die to an extruder. Near the center of the die is orifice 18 having an inlet portion 20, a cylindrical portion 22 and an outlet portion 24. Inlet portion 20 converges in the direction of flow of the resinous material and is attached to one end of cylindrical portion 22. Cylindrical portion 22 also is frequently referred to as the land. As is known in the art the diameter of the cylindrical portion 22 or land is determined by the desired diameter of the strands of resinous material and the length of the cylindrical portion 22 is a function of the melt properties of the resinous material used and the overall extruder and die design. Outlet portion 24 diverges in the direction of flow of the resinous material and is attached to the other end of cylindrical portion 22.

Generally inlet portion 20 is in the shape of a converging truncated cone; however, other converging shapes can be used. Frequently the inlet portion 20 is chamfered at an angle in the range of about 40° to about 60°. The use of a converging inlet portion is important in the prevention of stagnation of resinous material inside the extruder near the entrance of the orifice of the die and to reduce the pressure drop across the inlet portion. Resinous material subjected to high temperatures in extrusion processes due to stagnation in the extruder have substantially altered properties as compared to the resinous material which flows evenly through the extruder. Since various amounts of the stagnated material occasionally pass through the orifice, stagnated material causes impurities and nonuniformity in the extruded resinous material.

The use of a divergent outlet portion is important to reduce the problem of accumulation or buildup of resinous material at the outlet of the orifice. A buildup or accumulation of resinous material at the outlet of the orifice causes oxidizing and crosslinking of the material which results in problems similar to those caused by stagnated material previously discussed. As presently known in the art, outlet portion 24 is normally a continuation of cylindrical portion 22 and is generally a squareedged opening. As the resinous material in the form of a strand passes out of the orifice it expands. This expansion of the resinous material causes a portion of the material to contact the outer surface of the die, and frequently a small part of the resinous material sticks to the surface of the die and oxidizes, etc. Surprisingly, it has been found that accumulation of the resinous material is sharply reduced by constructing outlet portion 24 of the die so that outlet portion 24 is diverging in the direction of flow of the resinous material.

Although it is believed that the outlet portion can be almost any diverging shape with either straight or curved sides, excellent results have been obtained wherein outlet portion 24 has rounded or circular edges, that is, the outlet portion has the shape of a portion of the area circumscribed by a torus as shown in FIG. 1. The radius of the circle generating the torus and thus the radius of rounded edges varies widely, but generally is in the range of from about ¼ to 2 times the radius of the strand produced. As a practical matter, in the production of strands with a diameter of ¼ inch the minimum radius of the torus is about 1/16 inch. The maximum radius of the torus for ¼-inch strands is limited by the thickness of the die and the orifice spacing.

It is emphasized that the strand still expands when using an orifice with a rounded edged outlet portion, but the degree of accumulation or buildup of resinous material around the outlet of the orifice is substantially reduced.

The resinous materials suitable for use in accordance with the invention vary widely. Some of the materials useful in the invention include polyethylene, polypropylene, polystyrene and sytrene-butadiene copolymers. When styrene-butadiene copolymers are used in the invention the copolymers normally contain from about 70 to about 95 percent styrene units based on total weight of copolymer.

EXAMPLE

In the production of a resinous styrene-butadiene copolymer having approximately 76 weight percent styrene units and approximately 24 weight percent butadiene units based on total weight of the copolymer, strands of the resinous material were made with a diameter of ¼ inch.

In the first run the orifices in the extruder die were those normally used in the art having an outlet portion with squared-off edges and having the same diameter as the cylindrical or land portion, 3/16 inch. The inlet portion of the orifice was beveled or chamfered at an angle of 45°.

Buildup of the resinous material appeared around the outlet of the orifice within a short time after beginning the production of the strands. The resinous material accumulating around the outlet of the orifices darkened in color, indicating oxidation and crosslinking.

Subsequently, a second run was made using a die in which the outlet portion of the orifices had rounded edges. The outlet portion was the shape of the diverging area circumscribed by a torus wherein the circle of generation had a radius of ¼ inch. In all other aspects, the orifices were the same as in the previous run. A substantial reduction in buildup around the outlet of the orifices was apparent, resulting in improved polymer production.

What is claimed:

1. A process comprising:
    extruding a resinous material selected from the group consisting of polyethylene, polypropylene, polystyrene and styrene-butadiene copolymers through an orifice in a die to produce a strand, said orifice comprising an inlet zone, a cylindrical zone and an outlet zone, in that order;
    said inlet zone converging in the direction of flow of said resinous material and attached to one end of said cylindrical zone; and
    said outlet zone having a shape resembling a portion of the area circumscribed by a torus wherein the radius of curvature is in the range of from about ½ to 2 times the radius of the strand produced, diverging in the direction of flow of said resinous material and attached to the other end of said cylindrical zone.

2. The process of claim 1 wherein said resinous material is a styrene-butadiene copolymer containing from about 70 to about 95 percent styrene units based on total weight of the copolymer.

3. The process of claim 1 wherein said inlet zone is a converging truncated cone.

4. A die for extruding a strand of resinous material comprising:
    a base having at least one orifice through which said resinous material is extruded;
    said orifice having an inlet portion, a cylindrical portion and an outlet portion, in that order, said inlet portion being in the form of a truncated cone converging in the direction of flow of said resinous material and attached to one end of said cylindrical portion; and
    said outlet portion being in the form of a portion of the area circumscribed by a torus wherein the radius of the circle generating the torus is in the range of from about ½ to 2 times the radius of the strand produced, diverging in the direction of flow of said resinous material and attached to the other end of said cylindrical portion.

5. The die of claim 4 further in combination with a screw extruder having an inlet and an outlet wherein said die is attached to the outlet of said screw extruder.

6. The die of claim 4 further comprising a counterbore portion positioned adjacent said inlet portion.

7. The process of claim 1 wherein said orifice further comprises a counterbore zone positioned adjacent said inlet zone.

* * * * *